Patented Feb. 10, 1953

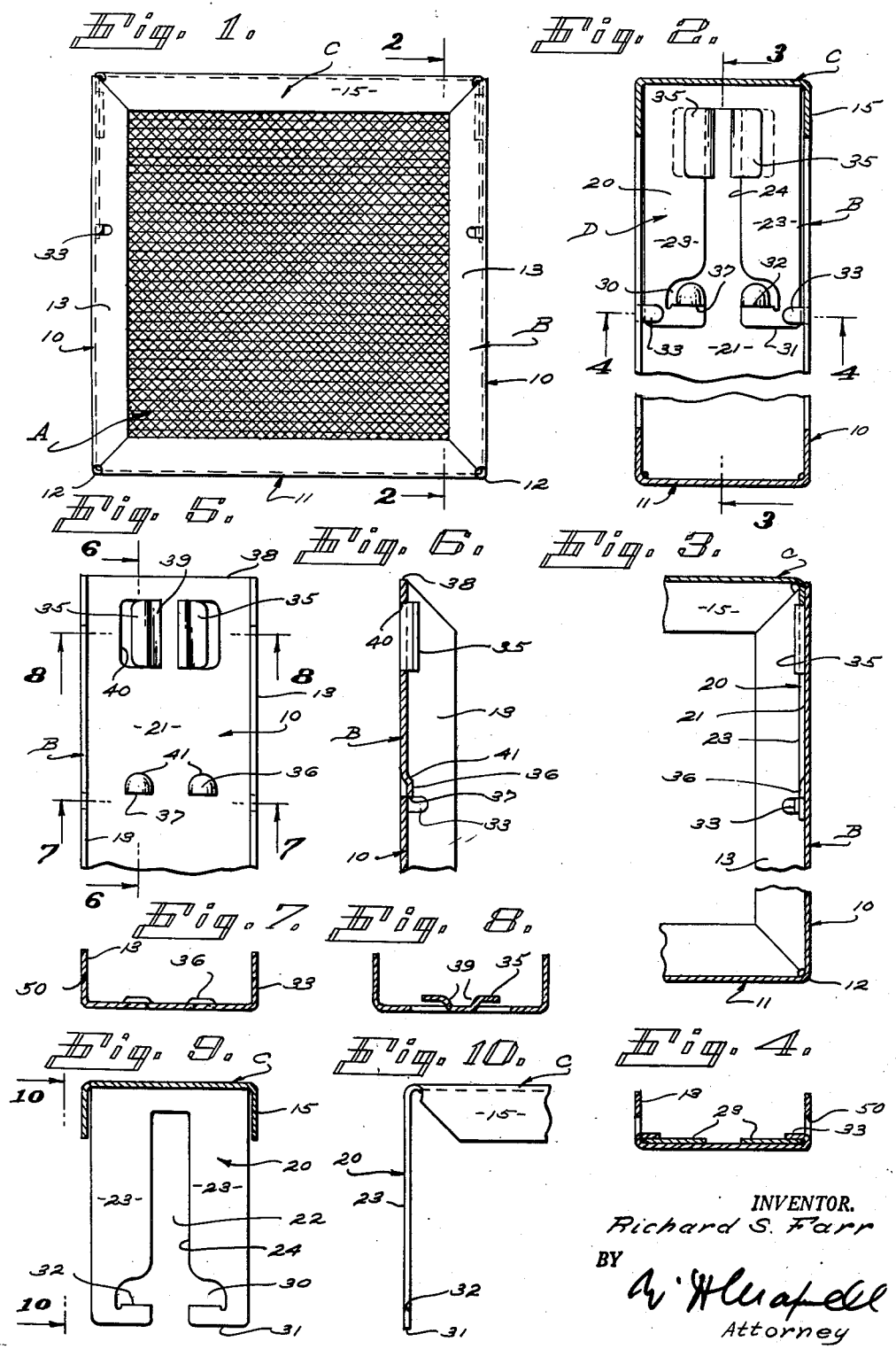

2,627,948

UNITED STATES PATENT OFFICE 2,627,948

FASTENING MEANS FOR FRAME ELEMENTS OR THE LIKE

Richard S. Farr, Los Angeles, Calif., assignor to Farr Company, Los Angeles, Calif., a corporation of California Application March 11, 1949, Serial No. 80,902

11 Claims. (Cl. 189—36)

This invention is concerned with fastening means for frame elements, or the like, and it is a general object of the invention to provide a joint or fastening means for connecting separately formed elements or parts, while more specifically it is an object to provide a frame joint, or a frame construction, such as may be used to advantage for carrying filter packs, or the like.

A general object of the present invention is to provide a joint construction for connecting elements or parts such as members of a frame, or the like, which joint construction is simple and inexpensive of manufacture, is easily operated or engaged, and is positive or secure when engaged.

Another object of the invention is to provide a joint or fastening means of the general character referred to suitable for connecting parts of a sheet metal structure, such as frame parts, or the like, and employing portions of, or projections on, the parts connected without requiring elements or parts to be applied or connected thereto.

Another object of the invention is to provide a frame construction suitable for carrying a filter pack, or the like, which construction is of simple, inexpensive form and construction, serves to effectively support and carry the filter pack, and is permanent in form following assembly.

The various objects and features of my invention will be fully understood from the following detailed description of a typical preferred form and application of the invention, throughout which description reference is made to the accompanying drawings, in which:

Fig. 1 is a face view or elevation of a frame embodying the present invention, showing it carrying a typical filter pack such as may be used for filtering air, or the like. Fig. 2 is an enlarged detailed transverse sectional view of the frame taken as indicated by line 2—2 on Fig. 1. Fig. 3 is a sectional view of the structure shown in Fig. 2, being a view taken as indicated by line 3—3 on Fig. 2. Fig. 4 is a transverse section taken as indicated by line 4—4 on Fig. 2. Fig. 5 is a view of one of the connected or fastened elements shown free of the other element and viewed as shown in Fig. 2 of the drawings. Fig. 6 is a sectional view taken as indicated by line 6—6 on Fig. 5. Fig. 7 is a transverse section taken as indicated by line 7—7 on Fig. 5. Fig. 8 is a transverse section taken as indicated by line 8—8 on Fig. 5. Fig. 9 is a view of the other connected or fastened element alone and viewed as it appears in Fig. 2 of the drawings, and Fig. 10 is a view taken as indicated by line 10—10 on Fig. 9.

The present invention is shown as applied to or incorporated in a filter pack frame, that is, in a frame-like structure which serves to carry or hold a filter pack, or the like. It will be apparent from the present disclosure that certain aspects of the invention are applicable to structures for use in various situations and, therefore, it is to be understood that the broader principles of the invention are not to be considered as limited to use for holding or in connection with filter packs, or any other particular parts or structures.

The filter pack A illustrated in the drawings is shown as a flat unit rectangular in plan configuration. For purpose of example the pack A will be referred to as a filter pack suitable for incorporation in air handling apparatus where it may serve as an air filter. It will be immediately apparent that such a pack may vary widely in form, character or construction, depending upon the service that it is to perform, or upon the medium to be filtered or handled thereby.

The frame provided by the present invention is of sectional construction and serves as a support or carrier for the pack A. In the form of the invention illustrated the frame involves, generally, a body section B, and a closure section C, the sections B and C being secured together by fastening means D.

The body section B in the case illustrated engages or embraces a substantial portion of the pack A but is open or clear at one side or end so that the pack can be readily applied to or engaged in the body prior to the closure being applied thereto. The body B is preferably a simple U-sahped structure having spaced parallel sides 10 and a connecting part or end 11 joining the sides at one end of the body. It is preferred that the body B be formed of a single elongate strip of suitable material, such as sheet metal, in which case the sides 10 and end 11 of the body are integrally joined at corners 12 where the strip is suitably bent or shaped.

Where the body B is to carry or hold a pack A, or the like, it is preferred that the elements of the body, that is, the sides 10 and end 11, be provided with inwardly projecting edge flanges 13 which give the elements of the frame a U or channel shape in cross sectional configuration, such as is shown in Figs. 7 and 8 of the drawings. With this construction the edge portions of the pack A may be engaged between the flanges 13 so that the pack is effectively and permanently retained in the frame. In the preferred construction the flanges 13 are integral with the sides and end of the body. For instance, they may be simply bent from the same sheet or strip of material out of which the other elements of the body are formed.

The closure C of the frame in the case illustrated is a simple, elongate member which is straight and which extends between the free ends of the sides 10 of the body B. The fastening means D provided by the present invention occur where the ends of the closure C engage the free ends of the sides 10. The closure C like the body may be formed of sheet metal and in the form of the invention illustrated it is shown provided with integral edge flanges 15 corresponding to the flanges 13 of the body and cooperating with the flanges 13 of the body in holding the pack A.

The fastening means D which occur at the ends of the closure B are preferably alike and each fastening means D involves, generally, a projection 20 on one section of the frame and a plurality of spaced parts on the other section of the frame which cooperate with the said projection. In the preferred arrangement illustrated in the drawings the projection 20 is on the end of the closure C and is a flat continuation or extension of the closure which extends at right angles thereto (see Figs. 9 and 10 of the drawings). Being thus shaped and disposed the projection 20 is such as to extend parallel with the side 10 of the body B with which the said projection is connected. In the preferred arrangement the projection 20 is related to the side 10 of the body to bear flat against one face of the side. In the drawings the projection is shown bearing flat on or against the inner face 21 of the side 10. The projection 20 may, in practice, vary widely in size or proportioning. However, it is preferred that it be a part of substantial length and that it be substantially coextensive in width with the side 10.

The projection 20 is provided with or is characterized by a deep recess 22 which enters it from its outer or free end and which divides the projection into two tongues 23. In the preferred construction the recess 22 is so formed that the edges 24, which define it, are parallel with each other, with the result that the tongues 23 are parallel, as clearly shown in Figs. 2 and 9 of the drawings.

The recess 22 preferably extends deep into the projection 20 to be substantially coextensive therewith so that the tongues 23 are of substantial length, as shown in the drawings.

The present invention provides notches 30 in the inner edges of the tongues 23 close to but spaced somewhat inward from the free ends 31 of the tongues. The notches are shaped to establish aligned shoulders 32 at the outer end portions of the tongues which shoulders are disposed transversely of the tongues and face inwardly or toward the inner or anchored ends of the tongues.

The parts on the side 10 of the body provided to cooperate with the projection 20 above described include ears 35 on or projecting from the face 21 of the side against which the projection 20 bears, lugs or projections 36 on the said side face of the side 10 presenting shoulders 37 to oppose and cooperate with the shoulders 32 of the tongues, and locks 33 which are preferably in the form of tabs which overlie the tongues when the structure is in operation.

The ears 35 are located close to but spaced somewhat from the free end 38 of the side 10 and there are preferably two ears 35, one to engage each of the tongues 23. In the preferred arrangement the ears 35 are joined to the side 10 by neck portions 39 and the neck portions are preferably located so that they are spaced apart laterally of the side and extend longitudinally thereof, the spacing of the neck portions being such as to allow the tongues to be slidably engaged therewith and with the ears 35, so that the neck portions occur within the recess 22 and in engagement with the edges 24 thereof. In the preferred arrangement illustrated the necks 39 and the ears 35 supported thereby are struck from the sheet of material forming the side 10, for instance, suitable cuts may be made in the said sheet of material along the lines 40 following which the material freed by the cuts may be readily shaped or formed to establish the necks 39 and the ears 35. It is to be observed that the ears 35 are of substantial width and length, and that they extend or project in opposite directions so that they are oppositely disposed and overlie or overhang the inner edge portions of the tongues 23. When the structure is fully engaged as shown in Fig. 2, the ears occur adjacent the innermost portion of the recess 22. The ears are spaced from the face 21 of the side 10 just far enough to accommodate the tongues and therefore they serve to effectively retain the tongues in engagement with the face 21.

The lugs occur at the inner face 21 of the side 10 at a point a substantial distance removed from the end 38 and they are removed from the ears 35. The lugs 36 are spaced apart transversely of the side 10 and are so located and proportioned as to occur in the notches 30 when the structure is engaged, as shown in Fig. 2 of the drawings. The shoulders 37 presented by the lugs are shaped and proportioned to receive the shoulders 32 of the tongues 23, as shown in Fig. 2, and when the shoulders 32 and 37 are thus engaged the tongues are effectively retained against separation from the side. In practice it is desirable that the lugs be suitably pitched or rounded at 41, which parts of the lugs are engaged by the ends 31 of the tongues as the structure is assembled. The rounding or pitching of the parts 41 of the lugs enables the tongues to be deflected and passed over the lugs in order to allow the tongues to reach the engaged position shown in Fig. 2.

The locks 33 may or may not be used, depending upon the service required and depending upon whether or not it is desired to provide a structure which is, in effect, permanent when once engaged. In the case illustrated there is a lock tab 33 provided in connection with or to engage each tongue 23, the tabs being such as to be engageable with the tongues after the tongues have been positioned as shown in Fig. 2, and being such as to so engage or overlie the tongues as to positively retain them against the face 21 in which position the shoulders 32 and 37 are maintained in cooperative relationship. In the form of the invention illustrated cuts 50 are provided in the flanges 13 at points about opposite the lugs 36, or at points where the tabs will properly engage and hold the tongues. As the structure is assembled the tabs 33 are left unformed except for the cuts 50, and it is only after the tongues have been engaged with the lugs that the tabs are engaged with the tongues by bending or deflecting them inwardly from the position shown in Figs. 5 and 6 to positions such as are shown in Figs. 2 and 3.

It is to be observed that the tabs being located in or formed from the side flanges of the side 10 are so positioned as to be readily accessible from the exterior of the structure, making it very convenient to suitably deflect or form the tabs to overlie the tongues after the frame has been fully assembled.

From the foregoing description it will be apparent that the present invention provides a fastening means or joint construction that securely and permanently connects parts such as the frame parts, above described. In the particular application of the invention illustrated and described the pack is initially placed in the U-shaped body B, whereupon the closure C is arranged in place so that the projections 20 of the two fastening means D engage the inner faces 21 of the sides 10. As the closure is thus assembled with the body the tongues 23 of the projections engage over the lugs 30 and finally reach positions where the shoulders 32 and 37 are engaged, as shown in Figs. 2 and 3. With the parts thus positioned the lock tabs may be engaged so that they overlie the tongues, thus permanently securing the parts together. It is to be observed that by locating the ears 35 at points longitudinally spaced from the lugs 36, the projections on the closure are effectively supported at spaced points, with the result that the frame is rigid and secure and is not subject to racking or twisting.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination two flat elongate members engaged one over the other, one of said members having a longitudinally disposed tongue with a shoulder at the outer end portion thereof facing longitudinally of said member, the other member having a lug projecting from the plane thereof into the plane of the first mentioned member and having a shoulder opposed to and engaged by the shoulder of the tongue, one of the members having a tab at one longitudinal edge thereof deformed to working position overlying the other member from one edge thereof where it positively holds the outer end portion of the tongue flat against the other member with the shoulders engaged, there being parts on the members spaced longitudinally from the lug and tab and cooperatively engaged when the shoulders are engaged and holding the inner end portion of the tongue against the other member.

2. In combination two flat elongate members engaged one over the other, one of said members having a longitudinally disposed tongue with a shoulder at its outer end portion facing longitudinally of said member, the outer end portion of the tongue being adapted to be deflected bodily away from said other member in a direction normal to the plane thereof, the other member having a lug projecting from the plane thereof into the plane of the first mentioned member and having a shoulder opposed to and engaged by the shoulder of the tongue, one of the members having a tab at one longitudinal edge thereof deformed to working position overlying the other member from one edge thereof where it holds the outer end portion of the tongue flat against the other member with the shoulders engaged, there being an ear of fixed form and longitudinally spaced from the lug and tab and projecting from said other member and overlying the inner end portion of the tongue to guide and retain it relative to said other end.

3. In combination two flat elongate members, one having flanges projecting from the longitudinal edges thereof and the other being guided by and between the flanges and having a longitudinally disposed flat tongue in the plane of said other member, the outer end portion of the tongue being adapted to be deflected bodily away from said other member in a direction normal to the plane thereof, the outer end portion of the tongue having a shoulder facing longitudinally of said other member, the first mentioned member having a lug projecting from the plane thereof with a shoulder opposed to and engaged by the shoulder of the tongue, the first mentioned member having a tab at one longitudinal edge thereof deformed to working position overlying the outer end portion of the tongue from one edge thereof where it positively holds the members one against the other, and cooperating stop shoulders on said members engaged and stopping relative movement between the members in one direction longitudinally thereof when the shoulder on the tongue and the shoulder of the lug engage and stop relative movement thereof, the tongue being resilient and such as to flex lengthwise in a direction normal to the plane of said other member to latch over the lug as the members are slid relative to each other, while engaged one with the other, to a position where the shoulders are engaged.

4. In combination two flat elongate members in engagement with each other, one member having a longitudinally disposed resilient tongue with an outer end portion having a shoulder facing longitudinally of said member, the other member having a lug projecting from the plane thereof with a shoulder opposed and engaged by the shoulder of the tongue and having a tab at one longitudinal edge thereof deformed to working position overlying the outer end portion of the tongue from one edge thereof where it holds the members one against the other, the outer end portion of the tongue being adapted to flex lengthwise and move away from the other member in a direction normal to the plane thereof, the members having cooperating stop shoulders engaged and stopping relative movement between the members in one direction longitudinally thereof when the shoulder on the tongue and the shoulder of the lug engage and stop relative movement between the members in the opposite direction, the stop shoulder of the first mentioned member being at the inner end of the tongue.

5. In combination two flat elongate members engaged one over the other, one of said members having two like longitudinally disposed tongues spaced apart transversely of said member and each having a shoulder facing longitudinally of said member, the other member having means projecting between and engaged by each of the tongues and having lugs projecting from the plane thereof into the plane of the first mentioned member, each lug having a shoulder opposed to and engaged by the shoulder of a tongue, one of the members having a tab at one longitudinal edge thereof deformed to working position overlying the other member from one edge thereof where it holds the members one against the other, with the shoulders of the tongues engaged with the shoulders of the lugs.

6. In combination two flat elongate members engaged one over the other, one of said members having two like longitudinally disposed tongues spaced apart transversely of said member and each having an outer end portion with a shoulder facing longitudinally of said member, the member having straight parallel side edges, the other member having straight parallel edge flanges between which the first mentioned member is confined and having lugs projecting from the plane thereof into the plane of the first mentioned member with shoulders opposed to and engaged by the shoulders of the tongues, one of the members having a tab at one longitudinal edge thereof deformed to working position overlying the other member from one edge thereof where it holds the outer end portion of a tongue against the other with the shoulders engaged, there being parts spaced longitudinally from the lug and projecting from said other member with portions engaged between the tongues and holding the tongues apart and with portions overlying the inner end portions of the tongues and holding them against the first mentioned member.

7. In combination two flat elongate members, one having flanges projecting from the longitudinal edges thereof and the other being guided by and between the flanges and having two like longitudinally disposed flat tongues in the plane of said other member, the tongues having outer longitudinal edges engaging the flanges and having opposed laterally disposed outer end portions with shoulders facing longitudinally of the tongues, the first mentioned member having lugs intermediate the flanges and projecting from the plane thereof with shoulders opposed to and engaged by the shoulders of the tongues and having tabs at the longitudinal edges thereof deformed to working positions where they overlie the outer end portions of the tongues at the said longitudinal edges thereof and hold the tongues against said other member, there being parts spaced longitudinally from the lug and projecting from said other member with portions engaged between the tongues and holding the tongues apart and with portions overlying the tongues holding the inner end portions of them against the first mentioned member, said parts having stop shoulders engaged by the first mentioned member and stopping relative movement between the members in one direction longitudinally thereof when the shoulders on the tongues and the shoulders on the lugs engage and stop relative movement between the members in the opposite direction longitudinally thereof, the tongues being resilient and such as to latch over the lugs as the members are slid relative to each other, while engaged one with the other, to a position where the shoulders are engaged.

8. In combination two flat elongate members engaged one over the other, one of said members having two like longitudinally disposed tongues spaced apart transversely of said member and each having a shoulder at the outer end portion thereof facing longitudinally of said member, the other member having means projecting between and overlying the inner end portions of the tongues and having lugs projecting from the plane thereof into the plane of the first mentioned member, each lug having a shoulder opposed to and engaged by the shoulder of a tongue, said other member having tabs at its longitudinal edges deformed inwardly therefrom to working position overlying the outer end portions of the tongues and holding them against said other member.

9. A frame including two sections, one a body with spaced elongate sides each having a free end and a flange projecting from one edge, the other an elongate retainer extending between the free ends of the body and having a flange projecting from one edge, and fasteners connecting the ends of the retainer to the free ends of the sides and each including two flat elongate members engaged one over the other, one of said members having a longitudinally disposed tongue with a shoulder facing longitudinally of said member, the other member having a lug projecting from the plane thereof into the plane of the first mentioned member and having a shoulder opposed to and engaged by the shoulder of the tongue, one of the members having a tab at one longitudinal edge thereof deformed to working position overlying the other member from one edge thereof where it holds the members one against the other, with the shoulders engaged, the said flanges being engaged end to end when the fasteners are engaged.

10. A frame including, two sections, one a body with spaced elongate parallel sides each having a free end, the other a straight elongate retainer extending between the free ends of the body, and fasteners connecting the ends of the retainer to the free ends of the sides and each including, flat elongate members on the sections and bearing against each other, the member on the retainer being an elongate flat tongue projecting laterally of the retainer and having a shoulder facing longitudinally of said member, the other member being integral with the body section and having a lug projecting from the plane thereof and having a shoulder opposed and engaged by the shoulder of the tongue and having a tab at one longitudinal edge thereof deformed to working position overlying the tongue from one edge thereof where it holds the members one against the other with the shoulders engaged with each other, the tongue being resilient and deflected in a direction normal to the plane thereof to latch over the lug as the members are moved relative to each other while engaged with each other and to position where the shoulders engage each other.

11. A frame including, two sections, one a body with spaced elongate parallel sides each having a free end and with flanges on the edges thereof and projecting inwardly of the frame, the other an elongate retainer extending between the free ends of the body and having flanges on the edges thereof and projecting inwardly of the frame, and fasteners connecting the ends of the retainer to the free ends of the sides and each including, flat elongate members on the sections and bearing against each other, one a flat elongate tongue projecting laterally from an end of the retainer and having a shoulder facing longitudinally of said other member, the other member being integral with a side of the body and having a lug projecting from the plane thereof with a shoulder opposed to and engaged by the shoulder of the tongue, the said other member having a tab deformed to working position overlying the tongue from one edge thereof where it holds the members one against the other, and cooperating stop shoulders on said members engaged and stopping relative movement between the members in one direction longitudinally thereof when the shoulder on the tongue and the shoulder of the lug engage and stop relative movement between the members in the opposite direction longitudinally thereof, the tongue being resilient and such as to latch over the lug as the members are slid relative to each other, while engaged one with the other, to a position where the shoulders are engaged, the ends of the flanges on the sides of the body being in engagement with the ends of the flanges on the retainer when the fasteners are engaged.

RICHARD S. FARR.

REFERENCES CITED

The following references are of record in the file of this patent:

UNITED STATES PATENTS

| Number | Name | Date |
|---|---|---|
| 254,635 | Gifford | Mar. 7, 1882 |
| 707,682 | Fairbrother, Jr. | Aug. 26, 1902 |
| 1,220,163 | Anderson | Mar. 27, 1917 |
| 1,267,352 | Baker | May 28, 1918 |
| 1,425,153 | Vigneault | Aug. 8, 1922 |
| 1,659,101 | Harvey | Feb. 14, 1928 |
| 1,975,622 | Schermerhorn | Oct. 2, 1934 |
| 2,001,681 | Huff | May 14, 1935 |
| 2,336,385 | Batcheller | Dec. 7, 1943 |
| 2,405,293 | Dahlman | Aug. 6, 1946 |